(12) United States Patent
Messerges et al.

(10) Patent No.: US 7,899,187 B2
(45) Date of Patent: Mar. 1, 2011

(54) DOMAIN-BASED DIGITAL-RIGHTS MANAGEMENT SYSTEM WITH EASY AND SECURE DEVICE ENROLLMENT

(75) Inventors: Thomas Messerges, Schaumburg, IL (US); Ezzat A. Dabbish, Cary, IL (US); Larry Puhl, Dundee, IL (US); Dean Vogler, Algonquin, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 683 days.

(21) Appl. No.: 10/306,494

(22) Filed: Nov. 27, 2002

(65) Prior Publication Data

US 2004/0103312 A1 May 27, 2004

(51) Int. Cl.
*H04L 9/00* (2006.01)
(52) U.S. Cl. .................................................... 380/279
(58) Field of Classification Search ......... 380/277–279, 380/270, 281, 282, 283; 713/156, 155, 164, 713/167, 171, 172
See application file for complete search history.

(56) References Cited

U.S. PATENT DOCUMENTS

| | | | |
|---|---|---|---|
| 6,452,925 B1 | 9/2002 | Sistanizadeh et al. | |
| 6,463,534 B1* | 10/2002 | Geiger et al. | 713/168 |
| 6,694,025 B1* | 2/2004 | Epstein et al. | 380/279 |
| 6,912,657 B2* | 6/2005 | Gehrmann | 713/171 |
| 6,980,660 B1* | 12/2005 | Hind et al. | 380/282 |
| 7,068,789 B2* | 6/2006 | Huitema et al. | 380/277 |
| 2002/0065778 A1* | 5/2002 | Bouet et al. | 705/57 |
| 2002/0144116 A1* | 10/2002 | Giobbi | 713/168 |
| 2002/0157002 A1* | 10/2002 | Messerges et al. | 713/155 |
| 2003/0076955 A1* | 4/2003 | Alve et al. | 380/201 |
| 2003/0120920 A1* | 6/2003 | Svensson | 713/168 |
| 2003/0174838 A1* | 9/2003 | Bremer | 380/270 |
| 2003/0196089 A1* | 10/2003 | Alve et al. | 713/172 |
| 2004/0003251 A1* | 1/2004 | Narin et al. | 713/172 |
| 2004/0006708 A1* | 1/2004 | Mukherjee et al. | 713/201 |
| 2004/0054923 A1* | 3/2004 | Seago et al. | 713/201 |
| 2004/0062400 A1* | 4/2004 | Sovio et al. | 380/286 |
| 2004/0096063 A1* | 5/2004 | Carroni et al. | 380/279 |
| 2004/0103312 A1* | 5/2004 | Messerges et al. | 713/201 |

FOREIGN PATENT DOCUMENTS

| | | |
|---|---|---|
| RU | 2183561 C2 | 1/1998 |
| WO | 9833656 A1 | 1/1998 |
| WO | 0115397 A1 | 3/2001 |

OTHER PUBLICATIONS

Rene Struik, IEEE P802.15 Wireless Personal Area Networks, Security for the 802.15.3 Wireless Personal Area Network (Draft!), Dec. 3, 2001.*

(Continued)

*Primary Examiner*—Beemnet W Dada

(57) ABSTRACT

New devices (101) are added to an existing domain by obtaining domain information (e.g., domain name and private domain password) from devices (101) already in the domain that preferably are in close proximity. Once the domain information has been transferred from the device already in the domain to the device being added to the domain, the device being added to the domain contacts a key issuer (105) to complete its registration into the domain. The key issuer returns a DRM domain private key (206) as well as a DRM certificate (202). Both are utilized by the device to obtain and render digital content (204).

17 Claims, 2 Drawing Sheets

OTHER PUBLICATIONS

Venkatraman et al., A Novel Authentication Scheme for Ad hoc Networks, Wireless Communication and Networking Conference, 2000. WCNC. 2000 IE, vol. 3, Sep. 23-28, 2000, pp. 1268-1273.*
Gehrmann et al., Enhancements to Bluetooth Baseband Security.*
Gehrmann et al., The Personal CA—PKI for a Personal Area Network.*
Rene Struik, IEEE P802.15 Wireless Personal Area Networks, Dec. 2001.*
"Secure Digital Music Initiative" SDMI Portable Device Specification, Part 1, version 1.0; PDWG Los Angeles, Jul. 8, 1999.
"IBM Response to DVB-CPT Call for Proposals for Content Protections & Copy Management : XCP Cluster Protocol", [Online] Oct. 19, 2001: Retrieved from the Internet: Url:http://www.almaden.IBM.com/Software/DS/contenentassurance/Papers/XCP_DVB.P> [retrieved on Oct. 19, 2001].
Heuvel Van Den S A F A et al.: "Secure Content Management in Authorised Domains", International Broadcasting Convention, XX, XX, Sep. 15, 2002, pp. 467-474.
European Patent Office, "Supplementary European Search Report", Application No. EP03786705, Oct. 28, 2010, 4 pages.

* cited by examiner

DOMAIN-BASED DIGITAL-RIGHTS MANAGEMENT SYSTEM WITH EASY AND SECURE DEVICE ENROLLMENT

FIELD OF THE INVENTION

The present invention relates generally to digital-rights management and in particular, to a method and apparatus for performing domain-based digital-rights management with easy and secure device enrollment.

BACKGROUND OF THE INVENTION

The ease at which valuable digital content (e.g., music, games, video, pictures, and books) can be copied and shared is worrisome to content owners. It is critical that content owners are fairly reimbursed. Because of this, it is a requirement that content distributors implement secure measures that help prevent piracy. Digital-Rights Management (DRM) is a popular phrase used to describe such protection of rights and the management of rules related to accessing and processing digital items. Content owners hope to protect their valuable digital content using a DRM system that is implemented by secure, tamper-resistant electronic devices.

One method of DRM protection allows content sharing among a domain of devices. Such a domain of devices, may for example share the same payment method/account information (e.g., share the same credit card number, account number, . . . , etc.), as well as sharing access to digital works. For example, a user may pay to access a certain digital work (e.g., a movie) a single time. Since all devices that are part of a domain share account information, any device may access the digital work. However, after any device accesses the work, all other devices will be prevented from accessing the work. Similarly, a user may choose to pay each time a digital work is accessed. Accessing the digital work by any device within the domain will cause the user's account to be charged accordingly.

While such a DRM system enables a user-friendly method for content sharing, such a system presents two problems. The first problem is that a user faces the potentially cumbersome task of registering all of his devices into a domain. The second problem is that the security of content in a domain is potentially threatened if users can remotely register devices into a domain over a long distance. Therefore a need exists for domain-based digital-rights management with easy and secure device enrollment that increases the security of content.

DETAILED DESCRIPTION OF THE DRAWINGS

Figure 1:
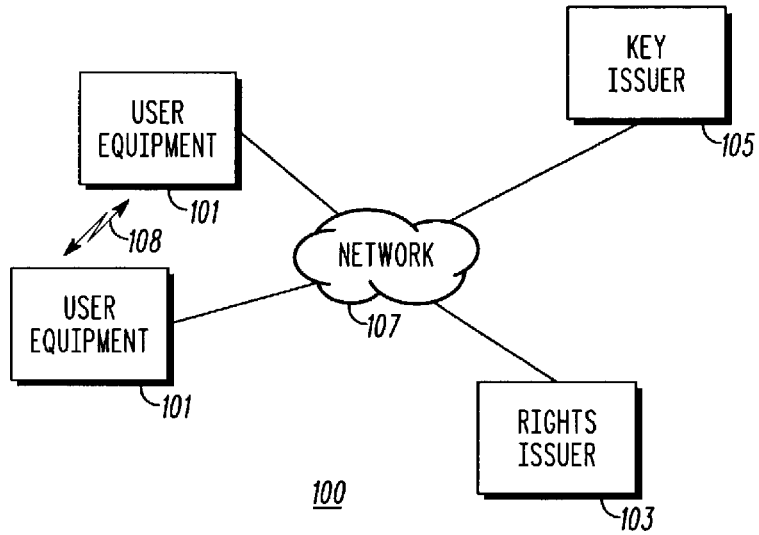
FIG. 1 is a block diagram of a digital-rights management system in accordance with the preferred embodiment of the present invention.

To address the above-mentioned need, a method and apparatus for performing domain-based digital-rights management with easy and secure device enrollment is provided herein. In accordance with the preferred embodiment of the present invention new devices are added to an existing domain by obtaining domain information (e.g., domain name and private domain password) from devices already in the domain that preferably are in close proximity. Once the domain information has been transferred from the device already in the domain to the device being added to the domain, the device being added to the domain contacts a key issuer to complete its registration into the domain. The key issuer returns the DRM domain private key as well as a DRM certificate. Both are utilized by the device to obtain and render digital content.

Both the use of a key issuer and the forced-short-range communication greatly improve ease of use, as well as security. Once domain information has already been established (such as domain name, password, etc.) for an initial device, it is cumbersome for users to remember and reenter the same information when they want to add new devices to their DRM domain. It is especially difficult to enroll devices after a long period of time has elapsed since the initial device was added to the domain or to enroll devices that may have limited user interfaces, such as a cellular phone, car radio, or set-top box.

It is much easier for a user if this DRM information can be obtained directly from a device that is already in the domain. However, merely allowing a new device to obtain domain information from an existing device is not sufficiently secure for enrolling the new device into the domain. Security is greatly enhanced if the new device then needs to send this DRM information to a trusted server (i.e., a key issuer) to complete its enrollment into the domain. With this approach, the key issuer can actively enforce domain enrollment and help improve security. A further security improvement over this approach is to force the DRM information to be transferred over a short-range-communication channel, rather than make it optional. Forcing short-range transfer of DRM information helps ensure that devices in the same domain were at one time physically near each other, which is one way to help enforce a security policy that devices cannot be added to a domain over large distances (e.g., using stolen DRM information propagated over the Internet).

Prior to describing the DRM system in accordance with the preferred embodiment of the present invention the following definitions are provided to set the necessary background.

Public-Key Cryptography—Cryptographic technique that uses a pair of keys, a public and a private key. The private key is used for either decrypting data or generating digital signatures and the public key is used for either encrypting data or verifying digital signatures.

Certificate—A digital certificate is block of data issued by a trusted certification authority. It contains expiration dates and a copy of the certificate holder's public key and identification data (e.g., address or serial number). The certificate-issuing authority signs the digital certificate so that a recipient can verify that the certificate is valid and thereby authenticate the certificate holder. Some digital certificates conform to a standard, X.509.

Digital signature—A digital signature (not to be confused with a digital certificate) is an electronic signature that can be used to authenticate the identity of the sender of a message or the signer of a document, and possibly to ensure that the original content of the message or document that has been sent is unchanged.

Digitally-signed object—a digital object comprised of data that is digitally signed. The digital signature is attached to the object.

Authentication—The process of determining whether someone or something is, in fact, who or what it is declared to be. Authentication of a device or user can entail the use of a digital certificate and a challenge response protocol that involves the use of public-key cryptography. Authentication of a certificate entails verification of the digital signature of the certificate.

Turning now to the drawings, wherein like numerals designate like components, FIG. 1 is a block diagram of DRM system 100 in accordance with the preferred embodiment of the present invention. As shown, DRM system 100 comprises user equipment 101, key issuer 105, rights issuer 103, and network 107. User equipment 101 comprises those devices such as computers, cellular telephones, personal digital assistants, . . . , etc. that are capable of running an application that renders digital content. For example, user equipment 101 may be a personal computer equipped with an application to "play" an MPEG Audio Layer 3 (MP3) file, with an application such as a standard MP3 player. Similarly, user equipment 101 may comprise a cellular telephone equipped to play an MPEG Video Layer 4 file with a standard MPEG video codec. Other possible embodiments for user equipment 101 include, but are not limited to, set-top boxes, car radios, networked MP3 players, Personal Digital Assistants, . . . , etc. Other possible embodiments for digital content include, but are not limited to music, games, video, pictures, books, maps, software, . . . , etc.

Regardless of the form that user equipment 101 takes, user equipment 101 is configured so that short-range communication between various user devices 101 can take place. In the preferred embodiment of the present invention short-range communication can utilize any physical connection (e.g., a cable, docking connector, etc.) or a number of over-the-air communication system protocols such as, but not limited to Bluetooth, 802.11, 802.15, infrared, . . . , etc. As shown in FIG. 1, short-range communication takes place over short-range communication link 108.

Key issuer 105 comprises an application that establishes authenticated communications with user equipment 101 and then provides user equipment 101 with a DRM certificate and a DRM private key. The authenticated communications between key issuer 105 and user equipment 101 comprise a challenge-response protocol whereby a unit certificate and domain information are exchanged. The manufacturer of equipment 101 installs the unit certificate into equipment 101. This certificate identifies user equipment 101 as a trusted DRM-enabled device. The domain information includes information such as the domain name, private domain password, and desired domain action (e.g., creates a new domain, register into an existing domain, leave a domain, etc).

The DRM certificate, which is obtained via the authenticated communications with key issuer 105, is utilized by user equipment 101 when obtaining rights objects (i.e., licenses to digital content) from rights issuer 103. Rights issuer 103 utilizes the DRM certificate to authenticate equipment 101 and pass rights objects (licenses) associated with digital content to user equipment 101. Particularly, the DRM certificate comprises a DRM public key (the corresponding DRM private key is securely stored in user equipment 101), identification information (e.g., the unique serial number or model number belonging to the user equipment 101), and a digital signature generated by key issuer 105.

In accordance with the preferred embodiment of the present invention all long-range communication between devices takes place over network 107. Network 107 may take various forms such as but not limited to a cellular network, a local-area network, a wide-area network, . . . , etc. For example, user equipment 101 may comprise a standard cellular telephone, with network 107 comprising a cellular network such as a code-division, multiple-access communication system.

Regardless of the form of user equipment 101, key issuer 105, short-range communication link 108, network 107, and rights issuer 103, it is contemplated that these elements within DRM system 100 are configured in well known manners with processors, memories, instruction sets, and the like, which operate in any suitable manner to perform the function set forth herein.

As discussed above, it is necessary that content distributors implement secure measures that help prevent piracy. Therefore, in the preferred embodiment of the present invention when a user purchases equipment 101 the user must first register equipment 101 with key issuer 105. After executing a secure authentication protocol, key issuer 105 will grant equipment 101 a DRM certificate and a DRM private key, allowing equipment 101 to obtain rights to digital content from rights issuer 103. In order to obtain the DRM certificate and the DRM private key, user equipment 101 and key issuer 105 must first execute a secure authentication protocol utilizing a unit certificate and unit private key that was installed on the equipment by the manufacturer. Domain information, such as the domain name, private domain password and desired domain action (e.g., create a new domain, register into an existing domain, leave a domain, etc), is also exchanged during the protocol.

Key issuer 105 authenticates the unit certificate (belonging to equipment 101) and then checks the domain information. If the domain information indicates that equipment 101 is being added to a new domain, key issuer 105 creates a new DRM public/private key pair. If equipment 101 is being added to an existing domain, key issuer 105 looks up that domain's DRM public/private key pair in a database. Key issuer 105 then creates a DRM certificate that contains all necessary information (e.g., the DRM public key, serial number, model number, etc.) for equipment 101 to obtain rights to digital content from rights issuer 103. Key issuer 105 then sends equipment 101 the DRM certificate and the DRM private key utilized by the domain.

When a user wishes to purchase rights to digital content from rights issuer 103, it provides rights issuer 103 with a DRM certificate. Thus in accordance with the preferred embodiment of the present invention, a DRM certificate (which contains the DRM public key) must be provided to rights issuer 103 before any rights to digital content will be transferred to the user. Rights issuer 103 will verify the authenticity of the DRM certificate and then generate a rights object based on information (e.g. the DRM public key) in the DRM certificate. Rights issuer 103 will then digitally sign the rights object and provide it to equipment 101. The rights object contains an encrypted encryption key (content encryption key) needed to render (execute) the digital content. The content encryption key is encrypted with the DRM public key so it can be decrypted only using the DRM private key.

As discussed above many customers prefer to access their digital content with several devices 101 (domain of devices) they may own. For example, a user may own a cellular telephone and a personal computer, both equipped with an MP3 player. The user may wish to utilize the same account to purchase digital content for both devices. Prior art solutions have attempted to solve this problem by allowing users to register their devices into a domain where digital content can be freely shared. While such a domain-based DRM system enables a user-friendly method for content sharing, such a system presents two problems. The first problem is that the user faces the potentially cumbersome task of registering all of his devices into a domain. For example, the domain information (such as domain name and private domain password, credit card information, . . . , etc.), exchanged with key issuer 105, needs to be manually entered into user equipment 101 before it can be added to an existing domain. The second problem is that the security of content in a domain is potentially threatened if users can remotely register devices into a domain over a long distance. For example, if domain information (e.g. domain name and private domain password) was public information (e.g. perhaps stolen and then propagated on the Internet), then anyone could register their device in the domain and have access to digital content bought for that domain. The key issuer can revoke the DRM domain certificate to minimize damage, but the ability to remotely register devices into an existing domain will always make this a vulnerability. If the only method to register devices into an existing domain was done via a close proximity channel with another device already in the domain, the opportunity for intruders to breach the domain is reduced.

In order to address these issues, in the preferred embodiment of the present invention new devices are added to an existing domain by obtaining domain information (e.g., domain name and private domain password) from devices already in the domain that preferably are in close proximity. In order to assure that devices are in close proximity, the domain information may be allowed to be shared only over a physical connection or a short-range connection, where the user has physical control over both the device being added to the domain and the device already in the domain. In a first embodiment, a touch pad is utilized as an interface between devices. The transfer of domain information from one device to another is automatically initiated when contact between the two touch pads is made. In another embodiment, each device can have a button that initiates the setup of the "close proximity" channel. Allowing the transfer of domain information only over a "close proximity" link creates added security since the two devices must be physically nearby and under the direct physical control of the owner of the devices.

Regardless of the transmission means, once the domain information has been transferred from the device already in the domain to the device being added to the domain, the device being added to the domain contacts key issuer 105 to complete its registration into the domain. For example, the device being added to the domain (i.e., equipment 101) provides its unit certificate and the domain information (acquired from equipment 101 already in the domain) to key issuer 105 and executes the previously mentioned authentication protocol.

Figure 2:
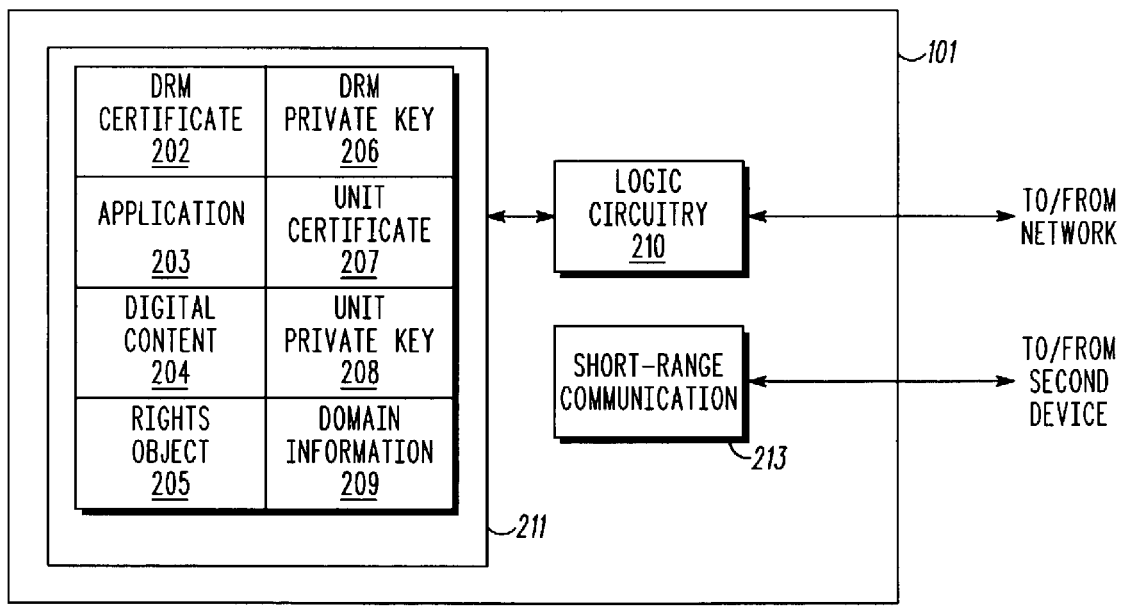
FIG. 2 is a block diagram of the user equipment of FIG. 1 in accordance with the preferred embodiment of the present invention.

FIG. 2 is a block diagram of user equipment 101 of FIG. 1 in accordance with the preferred embodiment of the present invention. As shown, user equipment 101 comprises storage 211 for storing DRM certificate 202, application 203, digital content 204, rights object 205, DRM private key 206, unit certificate 207, unit private key 208, and domain information 209. As known in the art, storage 211 may comprise any number of storage means, including, but not limited to hard disk storage, random-access memory (RAM), and smart card storage (e.g., Wireless Identity Module used in cellular telephones), . . . , etc. User equipment 101 additionally includes logic circuitry 210, which in the preferred embodiment of the present invention comprises a microprocessor controller such as but not limited to a Motorola MC68328 DragonBall integrated microprocessor or a TI OMAP1510 processor. Finally, user equipment 101 comprises short-range communication unit 213.

Figure 3:
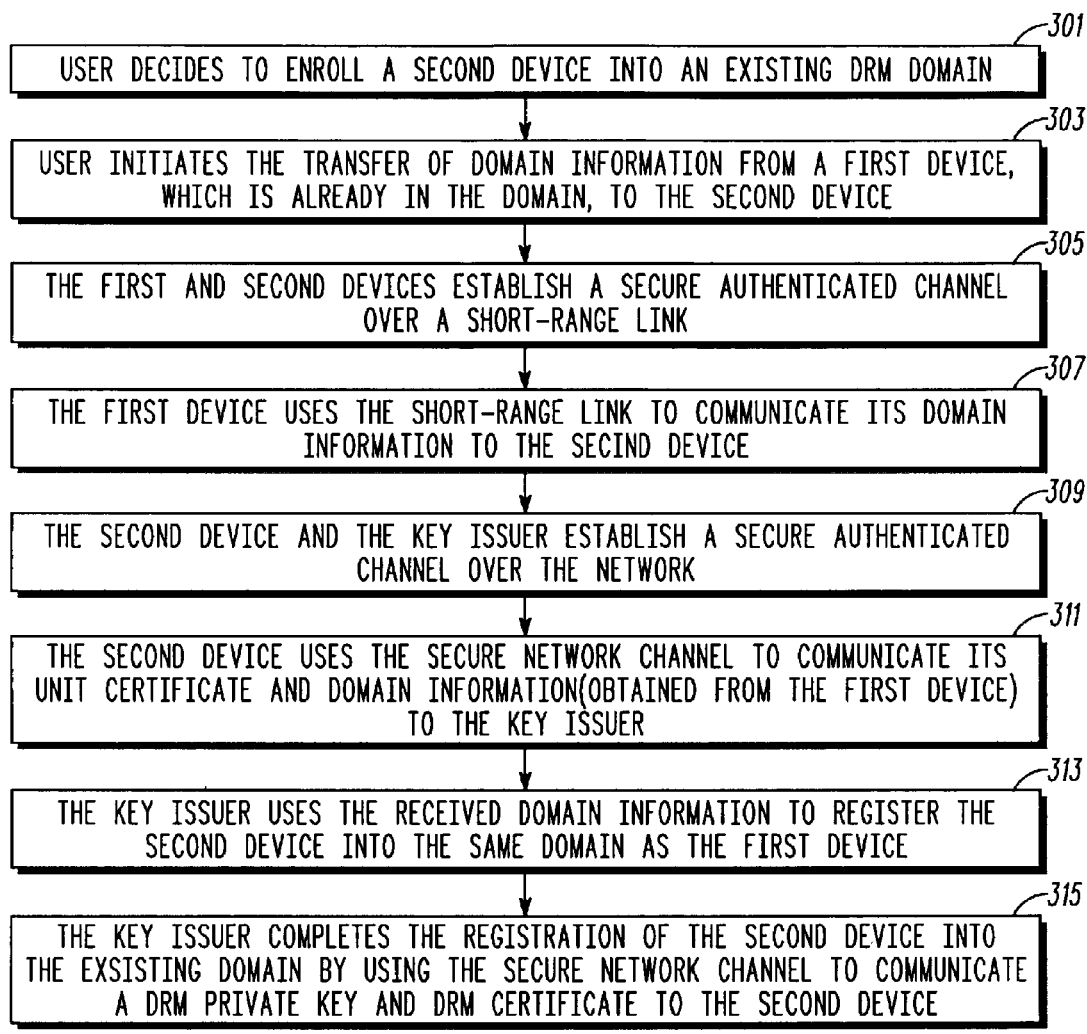
FIG. 3 is a flow chart showing operation of the digital-rights management system of FIG. 1 in accordance with the preferred embodiment of the present invention.

FIG. 3 is a flow chart showing operation of the digital-rights management system of FIG. 1 in accordance with the preferred embodiment of the present invention. The description that follows assumes that a first device is already registered with an existing domain. That is, it has domain information (e.g., domain name and private domain password) and has already obtained a DRM certificate that enables it to acquire rights to digital content from rights issuer 103.

The logic flow begins at step 301 where a user decides to enroll a second device into an existing DRM domain. At step 303 the user initiates the transfer of domain information 209 from the first device, which is already enrolled in the domain, to the second device. Although data may be transferred among devices in many ways (e.g., via floppy discs, via email, . . . , etc.), in the preferred embodiment of the present invention, domain information 209 will only be accepted by a device if it is transferred via a short-range communication link, however in alternate embodiments the transfer of domain information 209 can take place utilizing any method (short/long range) for transferring data between devices.

At step 305 the first and second devices establish a secure authenticated channel over a short-range communication link. This link may be authenticated by various means. For example authentication can be established by the fact that the user has physical control over each device (perhaps by pressing a button), or by entering a temporary PIN or password into each device. The security of the link is established using known protocols, such as the Wireless Transport Layer Security (WTLS) or Secure Sockets Layer (SSL). Once secure short-range link 108 is established, the first device communicates its domain information 209 to the second device at step 307. At step 309, the second device uses the network link 107 (e.g., the cellular network or Internet) to contact key issuer 105. The second device follows the same protocol with key issuer 105 as the first device did when establishing the domain, as already described above.

At step 311, the second device communicates its unit certificate 207 to key issuer 105 and may use its unit private key 208 to respond to a challenge. Once the channel is established it sends the domain information 209 to key issuer 105. At step 313, the key issuer receives the domain information 209, validates it (e.g., determines if domain name and domain password are valid), and if valid, registers the second device into the same domain as the first device. Finally, at step 315, key issuer 105 completes the registration of the second device into the existing domain by using the secure network channel 107 to communicate the DRM private key 206 (utilized by every device within the domain) and a newly created DRM certificate 202 to the second device.

As discussed above, once a DRM certificate 202 has been obtained, rights object 205 to digital content 204 can now be obtained from rights issuer 103. This process begins with DRM certificate 202 being provided to rights issuer 103 along with a request for digital content. In response, user equipment 101 receives rights object 205, which enables access to digital content 204. Both are stored in memory 211. In order to execute digital content 204, user equipment 101 must access DRM private key 206 and uses it to decrypt the content encryption key from rights object 205. Content 204 is decrypted, and is rendered by application 203. Logic circuitry 210 controls these functions.

Figure 4:
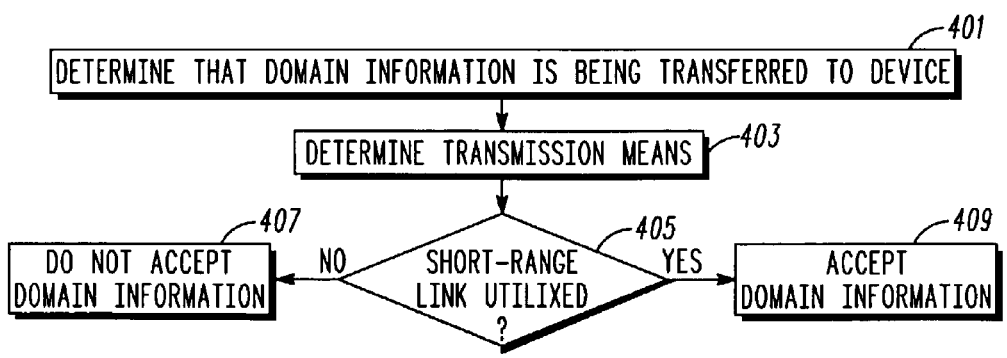
FIG. 4 is a flow chart showing operation of the user equipment of FIG. 2 in accordance with the preferred embodiment of the present invention.

FIG. 4 is a flow chart showing operation of user equipment 101 of FIG. 3 in accordance with the preferred embodiment of the present invention. In particular, the following steps show those necessary to obtain domain information 209 from another device 101 over a short-range communication link.

The logic flow begins at step 401 where logic unit 210 determines that domain information 209 is being transferred to device 101. As discussed above, domain information 209 may be transferred among devices in many different ways. For example, domain information 209 may be received as an attachment to an email application (not shown), or may be received by a floppy disk drive (not shown). In this embodiment of the present invention logic circuitry 210 determines the transmission means for domain information 209 (step 403), and at step 405 determines if the transmission means is a short-range transmission means. If at step 405 it is determined that the transmission means is a short-range transmission means, then the logic flow continues to step 409 where domain information 209 is accepted and stored in storage 211, otherwise the logic flow continues to step 407 where domain information is not accepted.

As discussed above, prior art domain-based DRM systems allow devices to be enrolled into a domain by simply obtaining a user's domain information. This is potentially insecure if devices are allowed to enroll that may not be in physical possession of the same individual. For example, a user may add a new device into a domain by simply typing in the domain information, which could be obtained via email or the Internet. The above procedures would not allow new devices to be enrolled into a domain unless the steps of FIG. 3 and FIG. 4 were followed.

If all subsequent enrollments into the family of devices are forced to use short-range communication for enrollment, the newly added device are forced to be in direct physical control of the user, resulting in a more secure DRM system. Additionally, the use of key issuer 105 greatly improves security. For example, if a key issuer were not used then devices would need to share their DRM private keys and issue DRM certificates. Hackers would have an easier time breaching the security of such a system since they have physical access to their devices and can tamper with the hardware to try and create false DRM certificates. In the preferred embodiment of this invention, the key issuer is a trusted entity that is not physically accessible to the users to the DRM system. Hackers may attempt to breach the security of the key issuer, but since it cannot be physically attacked, security is improved.

While the invention has been particularly shown and described with reference to a particular embodiment, it will be understood by those skilled in the art that various changes in form and details may be made therein without departing from the spirit and scope of the invention. For example, although the above description was given with respect to receiving/transmitting domain information consisting of a domain name and domain password among devices, one of ordinary skill in the art will recognize that any data may be substituted for the domain information without varying from the scope of the invention. Also, for example, the above description was given with respect to using public and private keys. One of ordinary skill in the art would recognize that alternate methods of securing the DRM system are possible using symmetric key techniques or broadcast key encryption techniques. It is intended that such changes come within the scope of the following claims.

The invention claimed is:

1. A method for registering a new device as part of a domain of devices, which share rights associated with a common account, for use in accessing protected digital content within a digital-rights management system, the method comprising the steps of:
   receiving domain information corresponding to the domain of devices from a device existing within the domain of devices;
   providing the domain information to a key issuer, which is separate from the domain of devices, causing the key issuer to issue a private key to the new device, wherein the private key is based on the domain information and is utilized by all devices within the domain of devices; and
   receiving the private key from the key issuer for use in accessing the protected digital content within the digital-rights management system.

2. The method of claim 1 wherein the step of receiving the domain information from the device existing within the domain of devices comprises the step of receiving a domain name and a domain password from the device.

3. The method of claim 1 wherein the step of receiving the domain information from the device existing within the domain of devices comprises the step of receiving domain information for the device existing within a domain of devices, all devices within the domain sharing account information.

4. The method of claim 1 wherein the step of receiving the domain information from the device existing within the domain of devices comprises the step of receiving the domain information over a short range link.

5. The method of claim 1 further comprising the steps of:
   determining if the domain information was received over a short-range link; and
   not accepting the domain information if the domain information was not received over the short-range link.

6. The method of claim 1 further comprising the step of:
   utilizing the private key to decrypt a second encryption key, the second encryption key utilized to decrypt digital content.

7. A method for registering a new device as part of a domain of devices, which share rights associated with a common account, for use in accessing protected digital content, within a digital-rights management system, the method comprising the steps of:
   receiving domain information corresponding to the domain of devices from a device existing within the domain of devices;
   determining if the information was received over a short-range communication link;
   accepting the domain information only if the information was received over the short-range communication link from another device within the domain of devices;
   providing the domain info to a key issuer causing the key issuer to issue a private key and a certificate to the new device, wherein the private key and the certificate are based on the domain information; and
   receiving the private key and the certificate from the key issuer for use in accessing the protected digital content within the digital-rights management system.

8. The method of claim 7 further comprising the steps of:
   providing the certificate to a rights issuer;
   receiving an encrypted encryption key from the rights issuer; and
   utilizing the private key to decrypt the encrypted encryption key.

9. The method of claim 8 further comprising the step of:
   utilizing the encryption key to decrypt digital content.

10. An apparatus comprising:
    communication circuitry receiving domain information from a device existing within a domain of devices, which share rights associated with a common account, for use in accessing protected digital content within a digital-rights management system;

storage for storing the domain information; and logic circuitry for providing the domain information to a key issuer, which is separate from the domain of devices, causing the key issuer to issue a private key for use in accessing protected digital content to the apparatus, wherein the private key is based on the domain information and is utilized by all devices within the domain of devices.

11. The apparatus of claim 10 wherein the domain information comprises a domain name and a domain password.

12. The apparatus of claim 10 wherein the domain of devices share account information.

13. The apparatus of claim 10 wherein the logic circuitry determines if the domain information was received via short-range communication, and accepts the domain information only if the domain information was received via short-range communication from a device within the domain of devices.

14. The apparatus of claim 10 wherein the private key is utilize to decrypt a second encryption key, and the second encryption key is utilized to decrypt digital content.

15. The apparatus of claim 13 wherein the logic circuitry is adapted to accept the domain information only if the domain information was received from a device within the domain of devices, which is physically near the apparatus, when the domain information is received.

16. The method of claim 7 wherein accepting the domain information only if the information was received over the short-range communication link from another device within the domain of devices includes accepting the domain information only if the information was received from another device within the domain of devices, which is physically near the new device receiving the domain information, when the domain information is received.

17. The method of claim 5 wherein not accepting the domain information if the domain information was not received over the short-range link includes not accepting the domain information if the domain information was not received from a device within the domain of devices, which is physically near the new device receiving the domain information, when the domain information is received.

* * * * *